June 10, 1930. R. H. MUELLER 1,762,306
BALL COCK
Filed Nov. 26, 1927 2 Sheets-Sheet 2
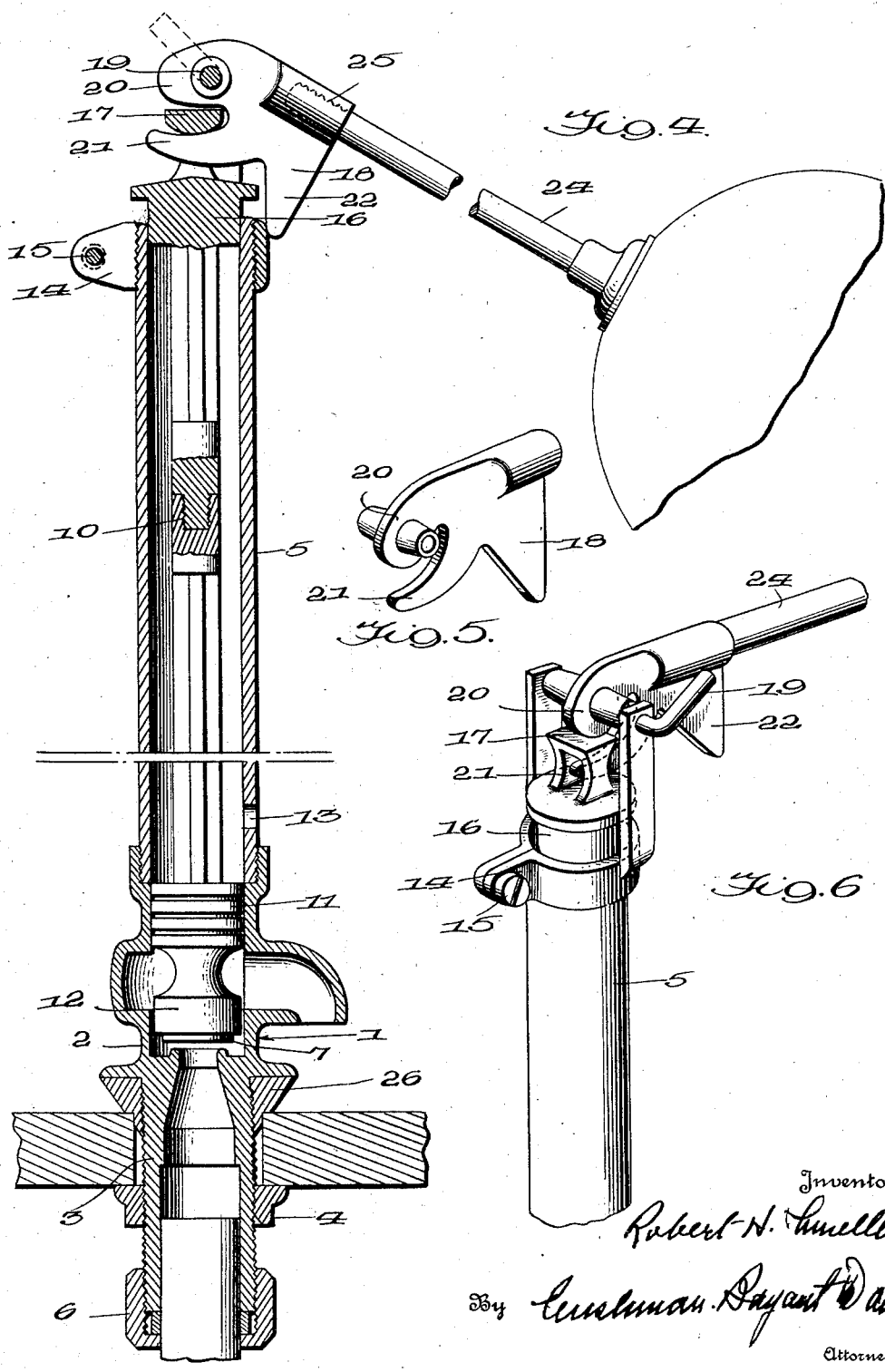
Inventor
Robert H. Mueller
By Cushman, Bryant & Darby
Attorneys Patented June 10, 1930

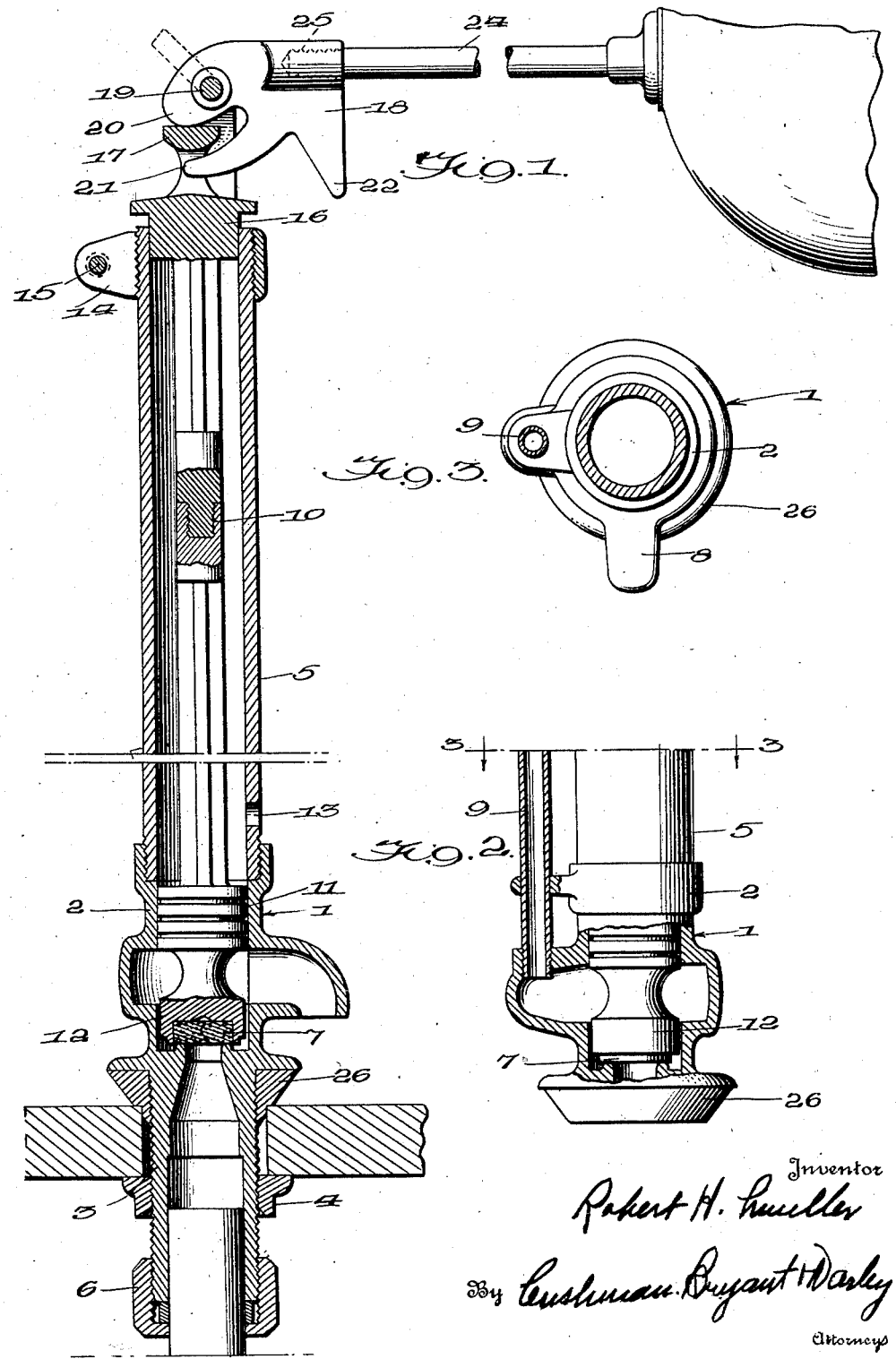

1,762,306

UNITED STATES PATENT OFFICE

ROBERT H. MUELLER, OF DECATUR, ILLINOIS, ASSIGNOR TO MUELLER CO., OF DECATUR, ILLINOIS, A CORPORATION OF ILLINOIS

BALL COCK

Application filed November 26, 1927. Serial No. 235,871.

This invention relates to float valves of the ball cock type for use with flush tanks and the like.

The object of the invention is to provide a valve of the type described, adaptable to angular adjustment in order to vary the position of the spout and the refill tube to that of the float rod; and adaptable to vertical adjustment in order to compensate for seat washers of varying thicknesses.

Another object of the invention is to provide a construction which will render the valve relatively noiseless when in use.

Still another object of the invention is to provide a valve economical in manufacture, and with installation advantages to meet the precise desires prevalent among those skilled in the art.

In the drawings:

Figure 1 represents a central cross section vertically of the ball cock.

Figure 2 is a longitudinal cross section of the valve chamber, valve seat and valve head, showing also the position of the refill tube.

Figure 3 is a plan view taken on the line 3—3 of Figure 2.

Figure 4 represents a central longitudinal cross section vertically of the ball cock in an open position.

Figure 5 is a view of the valve operating cam.

Figure 6 is an enlarged view of the bracket, cam abutment, and the cam.

Referring specifically to the drawings, 1 represents the body proper of the valve, which is cast with an upwardly extending portion 2, adapted to receive a screw-threaded male member and a downwardly extending screw threaded shank 3, upon which is screwed a nut 4 to clamp the valve in position in the tank.

A cone-shaped rubber washer 26 is placed between the flange of the valve body and the floor of the tank to give a water-tight joint. The connection with the water pipe is made by any suitable means, as at 6.

Within the valve body proper, and above the valve seat, on which a valve washer is adapted to seat, is formed an enlarged chamber. A spout 8, having a restricted outlet, delivers from the enlarged chamber into the tank.

A tube or casing 5, of suitable material, is screw-threaded into the extension 2 of the valve body. Adjacent the main tube is the refill tube 9, as shown in Figure 2, screw-threaded into an offset chamber connected with the larger chamber in the valve body.

The valve stem is preferably formed in two parts, which are screw-threaded together at 10. Formed near its lower end, are enlarged annular guide flanges 11, from which a circular stem of reduced diameter extends downwardly as a connecting member to the valve head 12. The valve head is of such diameter as to fit within the recess adjacent the valve seat, but leaving a restricted space between the valve head and the wall of the recess through which water may pass from the valve seat into the enlarged chamber. The valve head 12 is of smooth, cylindrical character.

A vent 13 is provided in the main tube 5 above the flanges 11 to prevent any water from ascending the tube, should it pass the said flanges.

At the upper end of the tube 5, is provided fine screw threads to receive a split adjusting bracket 14, screw-threaded on the tube. The split bracket 14 is securely held in any position of angular or vertical adjustment by means of a clamp screw 15.

The upper extension of the valve stem is formed with a cylindrical guide portion 16, which has formed therewith a cam abutment 17.

To operate in conjunction with the cam abutment is a cam member 18, mounted at the upper end of the bracket 14 by means of a pin 19. The pin 19 may be readily removed, thus facilitating removal of the valve when necessary for repairs or replacements. The cam member 18 has formed thereon, a depressing cam portion 20, which engages the upper surface of the cam abutment 17 and a finger 21, which is adapted to engage the under side of the said cam abutment. It will be noted that the space between the cam portion 20 and the finger portion 21 is purposely made of greater width than the thickness of the cam abutment portion 17. This feature is highly advantageous, as it enables the pressure of the water to force the valve to a greater lift than would be provided by a positive movement of the finger 21.

A stop finger 22 is cast integral with the cam member and adapted to engage the bracket 14 in order to limit the downward movement of the float ball, connected by means of the ball arm 24 to a screw-threaded socket 25 on the cam member.

In practical operation the invention offers many advantages and novel features.

Due to the short casting of the valve body, not only is the point of delivery into the tank at a low level, but is still at a sufficient height from the bottom of the tank to offer accessibility when installing or repairing.

Adjustability of such a valve is of great importance, and the present invention has fully accomplished this feature by means of the bracket 14 held upon the screw threads of the tubular portion 5 by the screw 15.

It may frequently occur when installing a ball valve in tanks of different makes and sizes that the refill tube must be bent to one side in order to insert its end in the overflow tube. In such cases, the overflow tube, which is usually of greater length than the ball valve casing, may be in the way of the float rod. To eliminate such difficulty, it is only necessary to loosen screw 15, and swing the bracket 14 to a position where the float rod does not interfere.

Should the spout be in the way of the flange of the flush valve, which is a separate fixture, and should it be desirable to maintain the float rod in a direction parallel with a wall of the tank, the nut 4 would be loosened, and the valve body rotated to the extent necessary to bring the spout out of the way of the flush valve, and the float rod would be carried back into alignment with the tank wall by simply loosening the screw 15 and adjusting the bracket 14.

The screw threads on the tube 5 around which the bracket 14 is placed, are purposely made very fine, in order that there may be only slight vertical movement of the bracket when making angular adjustment.

It is important when using a cam action valve that some means of compensating for valve washers of different thicknesses, be provided. This especially is true when replacements are made with valve washers other than the ordinary size. A vertical adjustment, facilitating the use of any size valve washer, can be effected by loosening the screw 15, and rotating the bracket 14 as many revolutions in either direction as may be required to form a perfect seal between the valve head and its seat.

There exists a tendency for valves of the type described to emit a "singing" noise at some point in their operation, usually when closing. By the improved construction of this invention, such noise is eliminated.

When the tank is filled, the float ball will be in substantially the position shown in Figure 1 of the drawings, and the valve 12 will be closed against the valve seat. As soon as the flush valve (not shown) is opened, the float ball will drop and the finger 21 will immediately lift the valve from its seat, as shown by Figure 4. The pressure of the water passing through the restricted opening about the valve head 12 will force the valve upward until the member 17 comes to a stop against the cam portion 20. The enlarged chamber of the valve will be filled with water, which will discharge through the restricted spout. The small diameter of the spout offers such resistance to the flow of water that the velocity about the valve head 12 is greatly reduced.

When the tank has been emptied, and the float ball begins to return to normal position, the pressure of the water against the lower face of the valve, due to its slow escape past the valve, will exert considerable force against the cam portion 20, and thereby have a tendency to prevent the float ball from rising. Because of this, the float will be more nearly submerged before moving upwardly than in ordinary ball valves. The result is that when the valve comes almost to its seat, the pressure under the valve being reduced owing to the partial closing of the main port, the float ball, already submerged in water, is forced upwardly, due to its buoyancy, and thus effects a relatively sudden closing of the main valve when it reaches the point where the "singing" noise would usually occur.

What is claimed is:

1. A valve of the ball cock type having a valve casing; a split bracket; a cam member detachably secured to said bracket comprising a valve depressing cam portion; a valve lifting finger and cam and a stop finger; and a ball arm with a float ball secured to said cam member.

2. A valve of the ball cock type having a casing, said casing having a relatively large valve chamber, a valve receiving recess and a restricted spout, a float operated cam, a bracket to hold said cam, a valve stem having a guide portion and a cam abutment thereon at its upper extremity, and a valve head at its lower extremity to fit loosely in the valve receiving recess.

3. A valve of the ball cock type having a casing provided with a vent; a relatively large valve chamber; a valve receiving recess and a restricted spout; a split bracket mounted on said casing; a cam member carried by said bracket and having a valve depressing cam portion, a valve lifting finger, a stop finger, and a screw threaded socket for a float ball arm; a valve stem with a cylindrical guide portion and a cam abutment at its upper extremity to work in conjunction with the said cam portion and finger, and a valve head at the lower extremity of the stem to fit loosely in the valve receiving recess.

4. A valve of the ball cock type having a casing; a relatively large valve chamber, a valve receiving recess and a restricted spout; a cam member carried by said casing comprising a valve depressing cam portion, a valve lifting finger, and a stop finger; a valve stem having a cylindrical guide portion in said casing and an abutment thereon at its upper extremity for engagement by said cam portion and said finger; and a valve head at its lower extremity to fit loosely in the valve receiving recess, to effect a relatively quick closing of the valve.

5. In a ball cock, the combination of a valve casing having a valve chamber provided with a restricted outlet and a valve receiving recess, a valve loosely fitting in the valve receiving recess so as to choke flow and increase pressure tending to open said valve, a valve stem connected to said valve, and a valve operating float connected to said valve stem.

6. In a ball cock, the combination of a valve casing having an enlarged valve chamber provided with a restricted outlet and a valve receiving recess, a valve loosely fitting in the valve receiving recess to choke flow and increase pressure tending to open said valve, a valve stem connected to said valve, a cam member having a stem engaging finger to open said valve and a stem engaging cam portion to seat said valve, and a float connected to said cam member.

7. A valve of the ball cock type having a casing; a valve provided with a stem reciprocably mounted in said casing; a supporting bracket mounted on said casing; a cam member carried by said bracket and comprising a cam portion to engage the valve stem and depress the valve, a finger to engage said valve stem and lift the valve, and a stop finger to limit the movements of said cam member; and a ball arm with a float ball secured to said cam member.

In testimony whereof I have hereunto set my hand.

ROBERT H. MUELLER.